(12) United States Patent
Liou et al.

(10) Patent No.: US 8,261,626 B2
(45) Date of Patent: Sep. 11, 2012

(54) BALL SCREW

(75) Inventors: Jhe-Kun Liou, Taichung (TW);
Chih-Cheng Feng, Taichung (TW);
Chun-Lin Yu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 968 days.

(21) Appl. No.: 12/272,119

(22) Filed: Nov. 17, 2008

(65) Prior Publication Data
US 2010/0122597 A1 May 20, 2010

(51) Int. Cl.
*F16H 1/24* (2006.01)
(52) U.S. Cl. ............... 74/424.86; 74/424.71; 74/424.87
(58) Field of Classification Search ............... 74/89.23, 74/89.28, 424.71, 424.75, 424.79, 424.81, 74/424.82, 424.84, 424.86, 424.87
See application file for complete search history.

(56) References Cited

U.S. PATENT DOCUMENTS

| 8,051,729 B2 * | 11/2011 | Yoshida et al. | 74/89.42 |
| 2009/0090207 A1 * | 4/2009 | Chang et al. | 74/424.86 |

* cited by examiner

*Primary Examiner* — Justin Krause
*Assistant Examiner* — Adam D Rogers

(57) ABSTRACT

A ball screw comprises a shaft, a nut, two return elements, plural rolling elements and a sleeve. When being rotated, the shaft will drive the nut to move and circulate the rolling elements within a circulation path defined by a loaded path and the return passages of the return elements. The nut is provided with a circular groove in an outer circumferential surface thereof, and the sleeve is disposed in the circular groove. The sleeve is provided with plural push grooves in an inner circumferential surface thereof, and there is an angular difference between a rolling passage in the nut and the respective push grooves, and the push grooves cooperate with the rolling elements which pass through the rolling passage. By such arrangements, the push grooves of the sleeve will be pushed by the rolling elements to convert the linear motion into rotary motion, thus making the sleeve rotate.

19 Claims, 9 Drawing Sheets

BALL SCREW

BACKGROUND OF THE INVENTION

1. Field of the Invention

The present invention relates to a rolling element screw applied in linear transmission, and more particularly to a ball screw which is provided with a rotatable sleeve on the nut, and the rotatable sleeve can be rotated by the rolling elements to drive other structures to realize the desired movement.

2. Description of the Prior Art

Conventional ball screws each are commonly provided with a nut on a screw in such a manner that when the screw is rotated, the nut will be driven to move, thus driving a working platform combined on the nut to move. Each of two opposite ends of the nut is provided with a recirculation part, and between the nut and the respective recirculation parts is disposed at least one circulating channel. Plural balls are disposed in the circulating channels. When the screw is rotated to drive the nut to move, the balls will cooperatively rolls circularly to reduce the interference between the screw and the nut and increase the lubrication effect. When the balls pass through the linear circulation hole of the nut, the moving power of the balls is in direct proportion to the rotation of the screw. Such a moving power contains a great amount of energy, so far, however, it has never been utilized, thus causing the power and energy waste.

Hence, in order to obtain and substantially utilize the power caused when the balls pass through the linear circulation hole, the inventor of the present invention has developed a new ball screw.

SUMMARY OF THE INVENTION

Technical Problem to be Solved

As for the conventional ball screw structures, when the screw is rotated, the balls will linearly move to and fro within the circulation passage, and so far, this moving power has not been utilized, thus causing the power waste. Therefore, how to substantially utilize the passing power of the balls is the technical problem to be solved.

Technical Features for Solving the Above Technical Problem

In order to solve the above technical problem, the present invention provides a ball screw, which comprises a shaft, a nut, two return elements, plural rolling elements and a sleeve. The shaft includes a thread groove in an outer circumferential surface thereof. The nut is movably mounted on the shaft and provided in an inner circumferential surface with a thread channel, which cooperates with the thread groove to define a loaded path. The nut is axially provided with rolling passage. Further, the nut is provided with a circular groove in an outer circumferential surface thereof. The circular groove of the nut communicates with the rolling passage. The return elements are disposed on the nut, and each of the return elements is provided with a return passage to cooperate with the rolling passage. The rolling elements are provided in the loaded path, and the sleeve is disposed in the circular groove of the nut and provided with plural push grooves in an inner circumferential surface thereof. There is an angular difference between the push grooves and the rolling passage. The push grooves will cooperate with the rolling elements that pass through the rolling passage.

As compared with the conventional ball screws, the ball screw of the present invention has the following advantages:

The primary objective of the present invention is to provide a ball screw which can utilize the rotation of the sleeve to provide an extra power. The ball screw of the present invention utilizes the rotation of the shaft to make the rolling elements roll circularly in the nut, and between the respective push grooves of the sleeve and the rolling passage is defined an angular difference, so that when the rolling elements pass through the rolling passage, the push grooves of the sleeve will be pushed by the rolling elements to convert the linear motion into rotary motion to provide a torque so as to rotate the sleeve, thus utilizing the rotation of the sleeve to provide the extra power.

The secondary objective of the present invention is to provide a ball screw which can offer a cooling function without using any additional auxiliary cooling structure or device. The ball screw of the present invention utilizes the rotation of the sleeve to provide the extra power, so that when the sleeve is provided with the blades on its circumferential surface, the blades will rotate to produce wind to cool the movable platform disposed on the nut without using any additional auxiliary cooling structure or device, thus saving cost.

The third objective of the present invention is to provide a ball screw which can perform two kinds of operations synchronously. The ball screw of the present invention utilizes the rotation of the sleeve to provide the extra power, so that when the sleeve is provided on its circumferential surface with the gear which is linked with plural idle wheels and finally linked with a punch through a crank disposed on a movable platform, the reciprocating punching operation of the punch will be performed, thus achieving the objective of punching a hole. As a result, the ball screw of the present invention can perform two kinds of operations synchronously.

The fourth objective of the present invention is to provide a ball screw, which can offer a warning function to improve the safety. When the ball screw of the present invention is applied on a lifting platform, the rotation of the sleeve will drive the light-emitting element disposed on the circumferential surface of the sleeve to rotate synchronously, so that when the lifting platform lifts and descends, the rotation of the luminous light-emitting element can be observed, thus offering the warning function to improve the safety.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
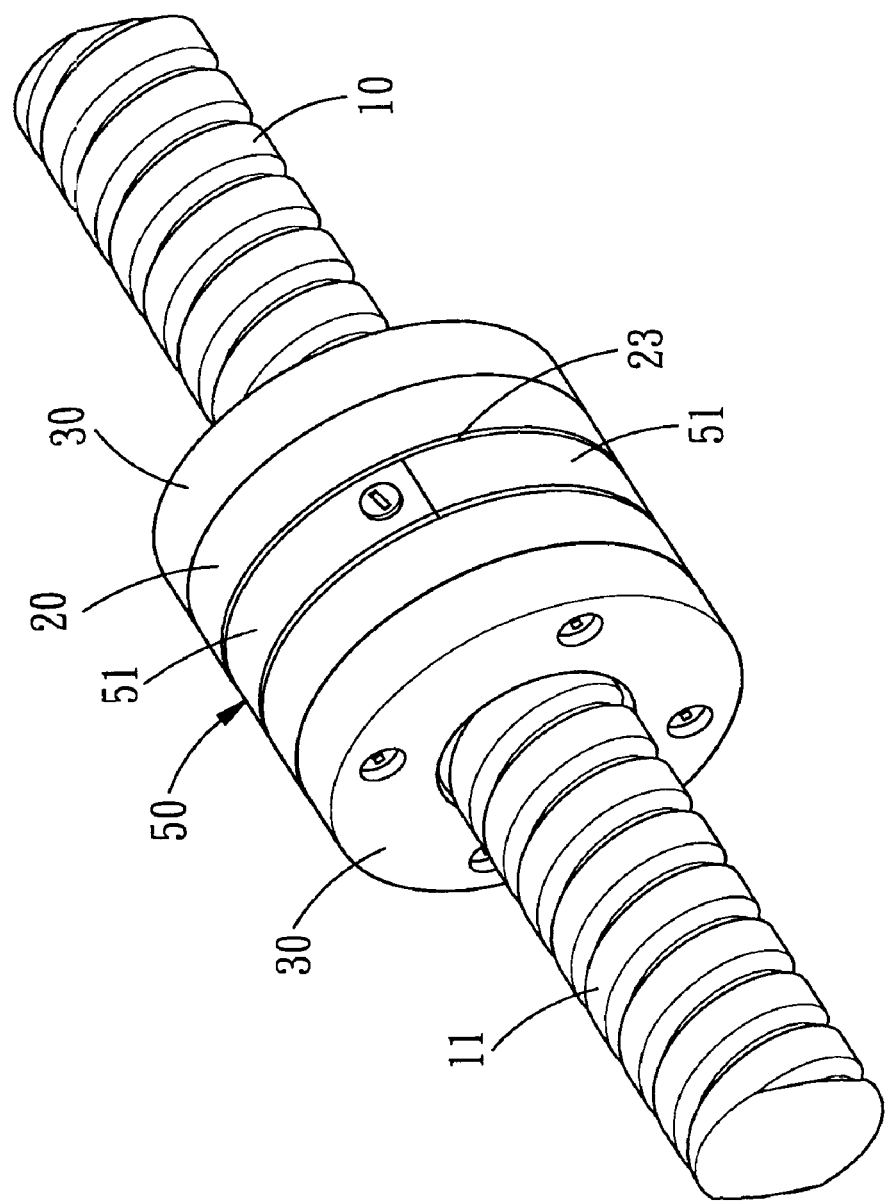
FIG. 1 is a perspective view of a ball screw in accordance with the present invention.
Figure 2:
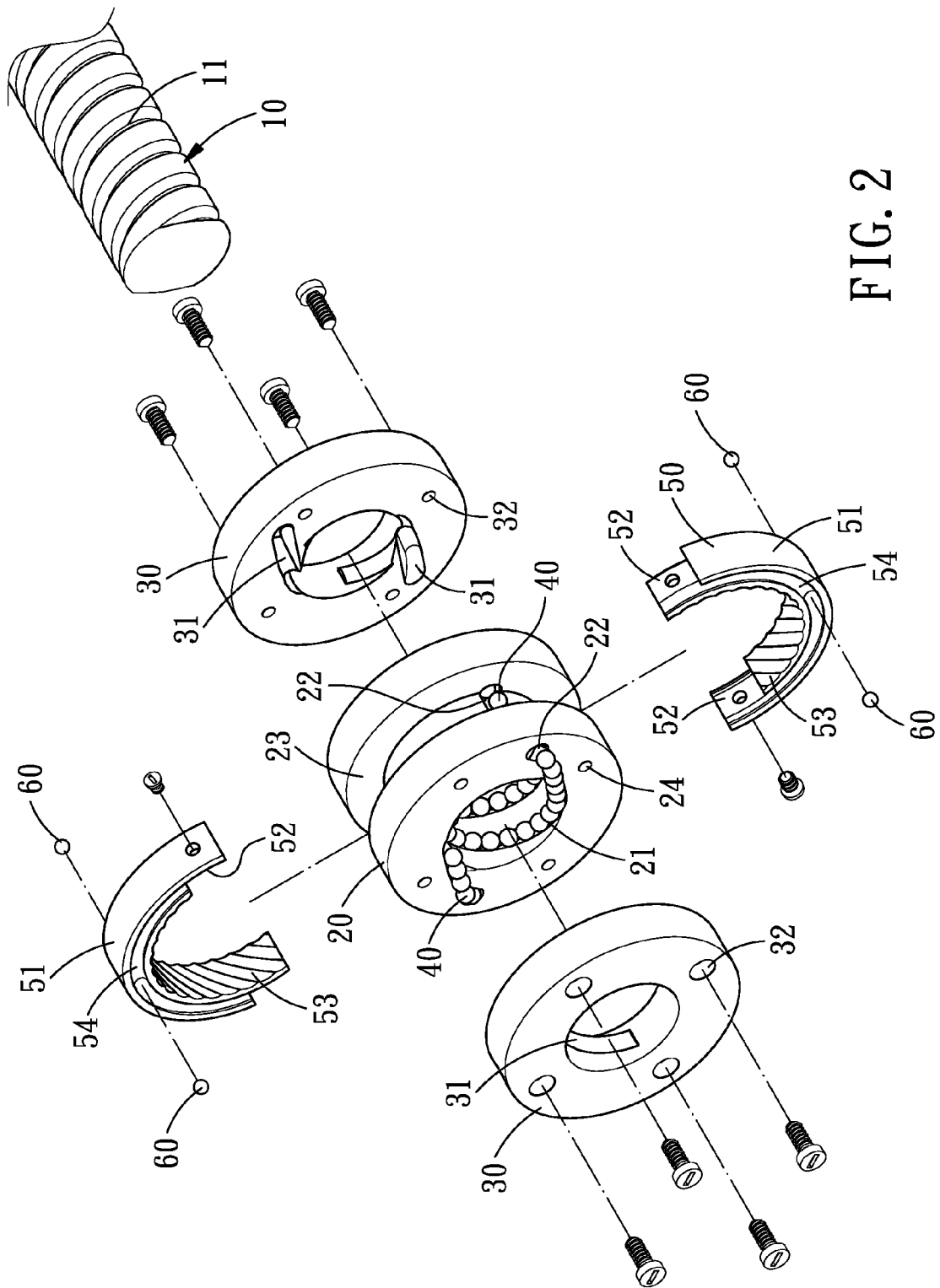
FIG. 2 is an exploded perspective view of the ball screw in accordance with the present invention.
Figure 3:
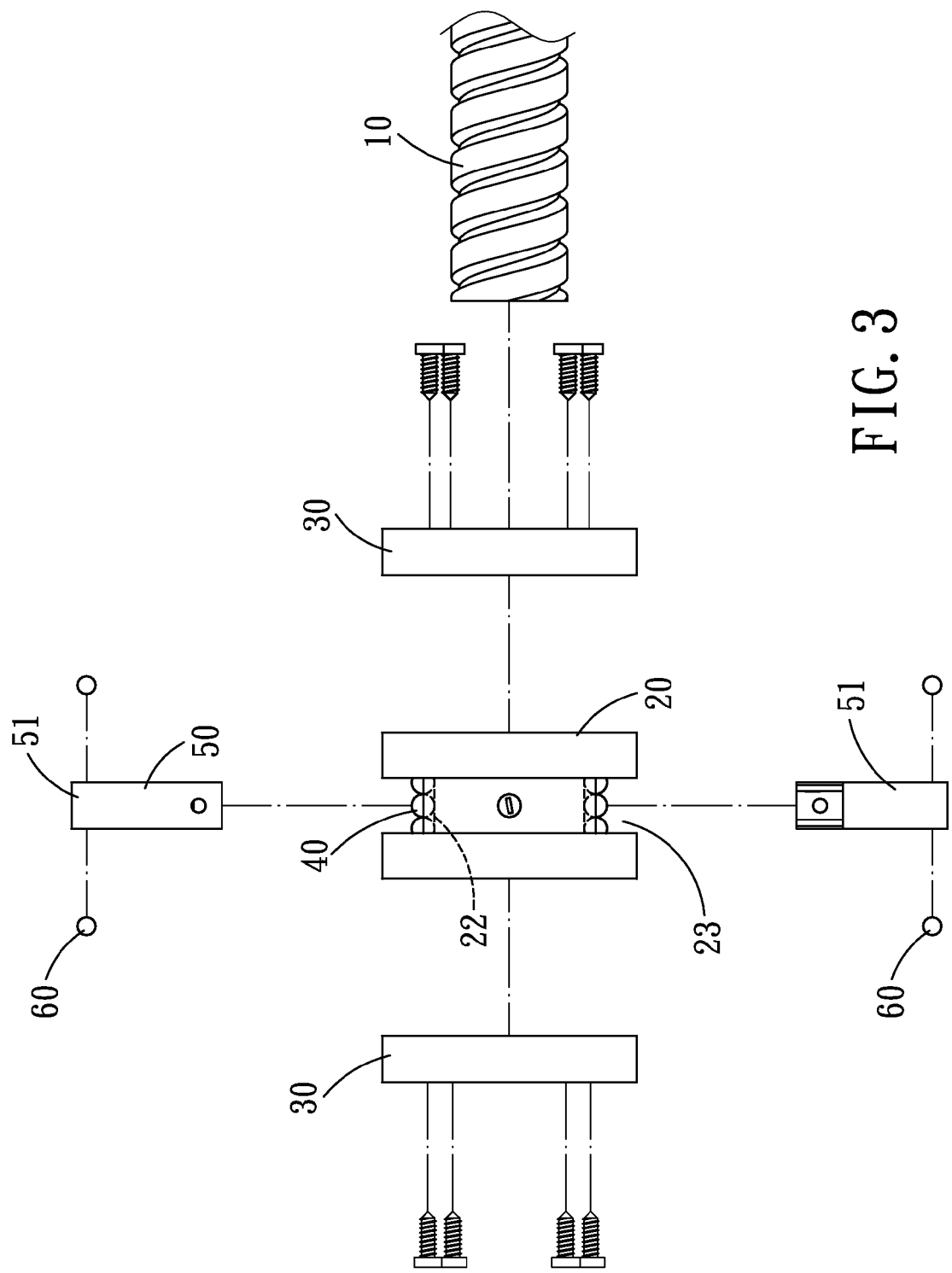
FIG. 3 is an exploded plane view of the ball screw in accordance with the present invention.

Referring to FIGS. 1-3, a ball screw in accordance with the present invention comprises a shaft 10, a nut 20, two return elements 30, plural rolling elements 40, a sleeve 50 and plural bearing elements 60.

The shaft 10 includes a thread groove 11 in an outer circumferential surface thereof, and in the present embodiment, the thread groove 11 is a double-thread groove.

The nut 20 is provided with a through hole to be movably mounted on the shaft 10. The through hole includes a thread channel 21 in the inner circumferential surface thereof. The thread groove 11 cooperates with the thread channel 21 to define a loaded path. The nut 20 is axially provided with a rolling passage 22. The rolling passage 22 shown in FIGS. 1-3 is parallel to the shaft 10. The nut 20 is further provided in the outer circumferential surface thereof with a circular groove 23 communicating with the rolling passage 22. Additionally, the nut 20 is provided with plural locking holes 24 in each of two opposite ends thereof.

The two return elements 30 are disposed on the nut 20 and each are provided with a return passage 31. The return passages 31 connect the loaded path to define a circulation path. Further, the respective return elements 30 are axially provided with plural locking holes 32 which cooperate with the locking holes 24 to lock the return elements 30 on the nut 20 by screws.

The plural rolling elements 40 are in the form of balls and provided in the circulation path defined by the return passages 31 and the loaded path.

The sleeve 50 is disposed in the circular groove 23 of the nut 20 and consists of two semicircular sleeve elements 51. Both ends of each of the semicircular sleeve elements 51 are provided with a combining end 52. The combining ends 52 of one of the semicircular sleeve elements 51 are combined to the combining ends 52 of the other of the semicircular sleeve elements 51 to form a circle. The respective combining ends 52 of the sleeve elements 51 are provided with threaded holes to be screwed with screws. The sleeve 50 is provided in the inner circumferential surface thereof with plural push grooves 53. There is an angular difference between the respective push grooves 53 and the rolling passage 22, which is preferably 45 degrees. The push grooves 53 further cooperate with the rolling elements 40 that pass through the rolling passage 22. Additionally, the sleeve 50 is provided with an annular bearing groove 54 in each of two opposite ends thereof.

The plural bearing elements 60 are disposed in the annular bearing grooves 54 and in contact with side walls of the circular groove 23.

Figure 4:
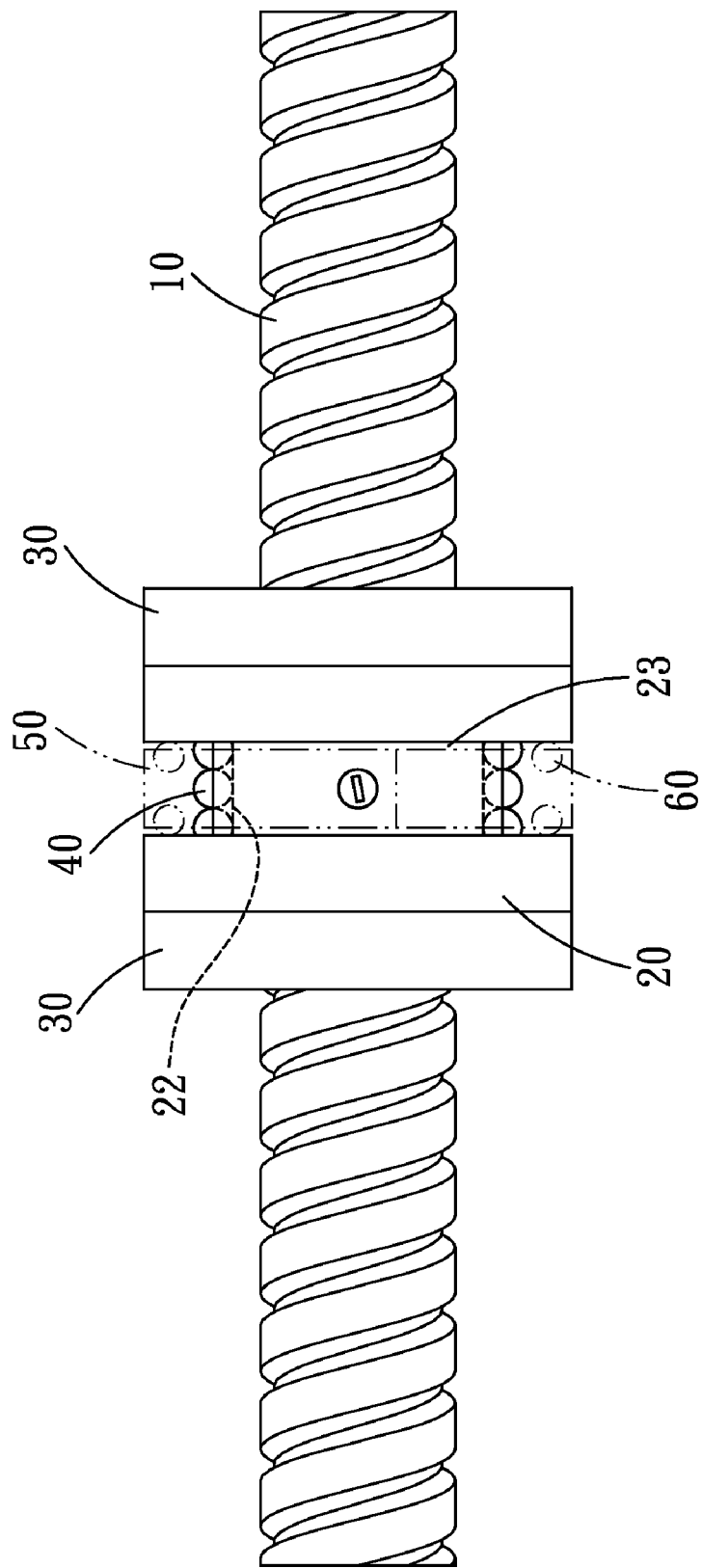
FIG. 4 is an assembly view of the ball screw in accordance with the present invention.

As shown in FIG. 4, when the shaft 10 is rotated, the rolling elements 40 in the nut 20 will circularly roll along the loaded path, and the push grooves 53 of the sleeve 50 will cooperate with the rolling elements 40 which pass through the rolling passage 22. Since there is the angular difference between the respective push grooves 53 and the rolling passage 22, when the rolling elements 40 circulate from the rolling passage 22 to the push grooves 53, the push grooves 53 will be pushed by the rolling elements 40 to rotate the sleeve 50. Therefore, the sleeve 50 can offer the rotary power.

Figure 5:
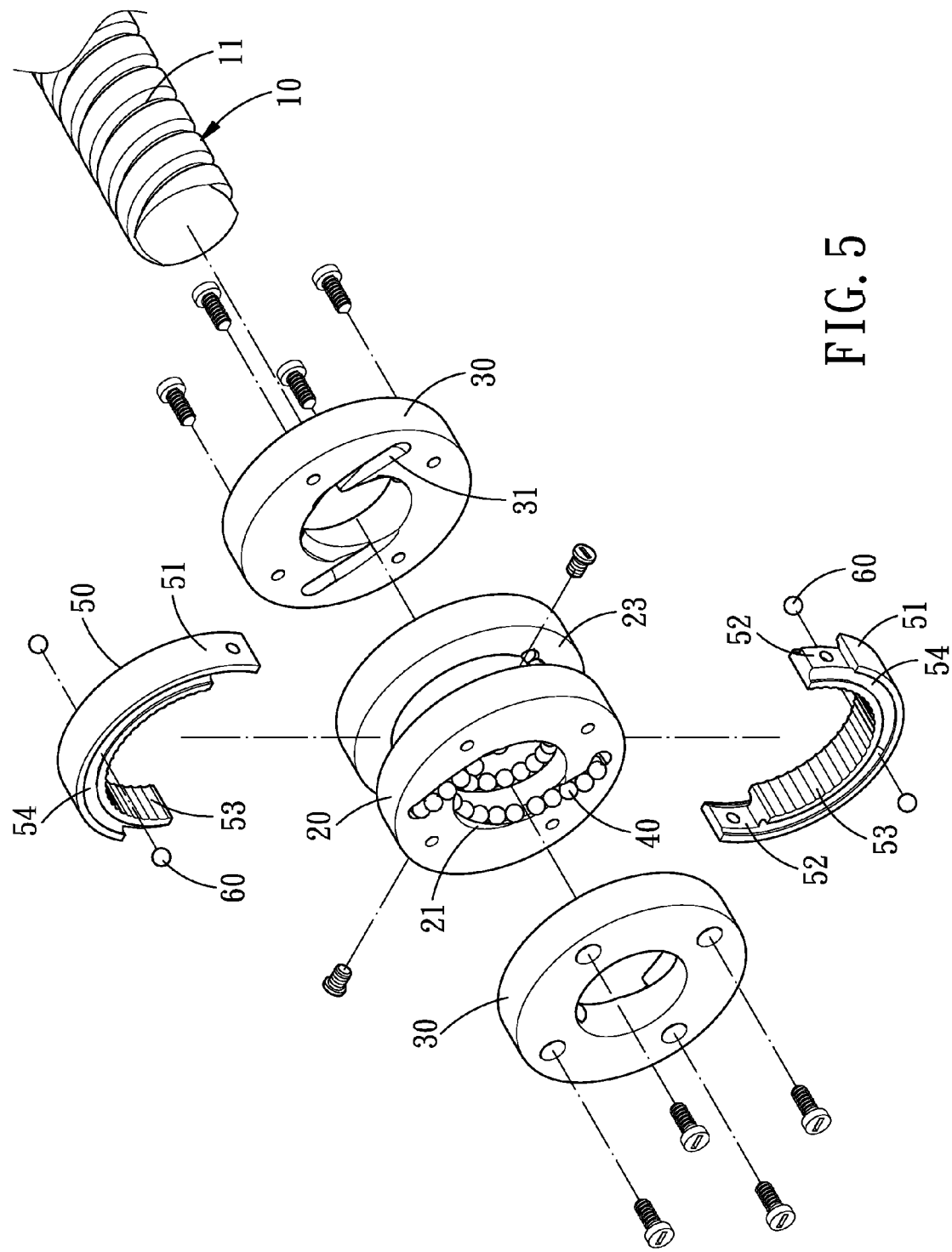
FIG. 5 is a perspective view of a ball screw in accordance with another embodiment of the present invention.
Figure 6:
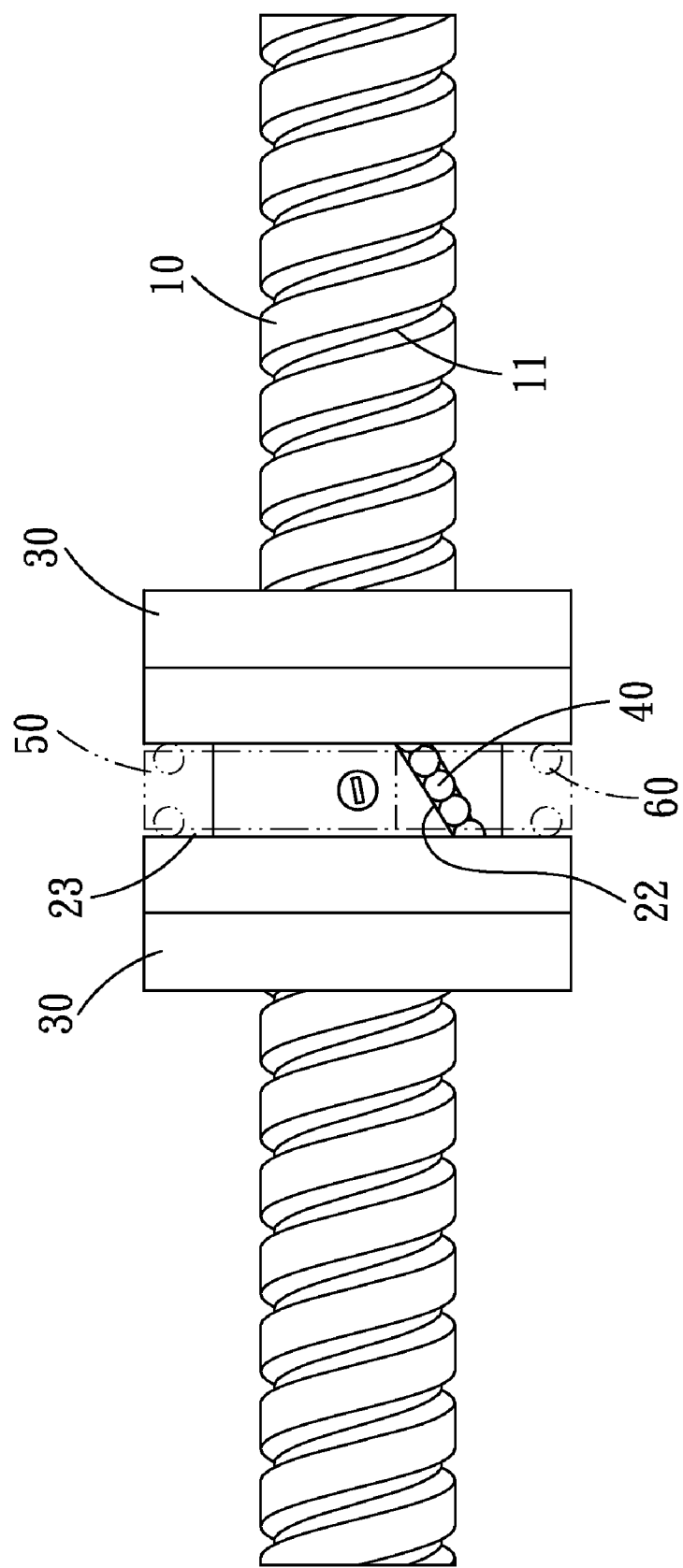
FIG. 6 is an assembly view of the ball screw in accordance with the another embodiment of the present invention.

Additionally, as shown in FIGS. 5-6, there is an angular difference between the rolling passage 22 of the nut 20 and the shaft 10, and the push grooves 53 of the sleeve 50 are disposed parallel to the shaft 10. By such an arrangement, the sleeve 50 can also offer the rotary power.

Figure 7:
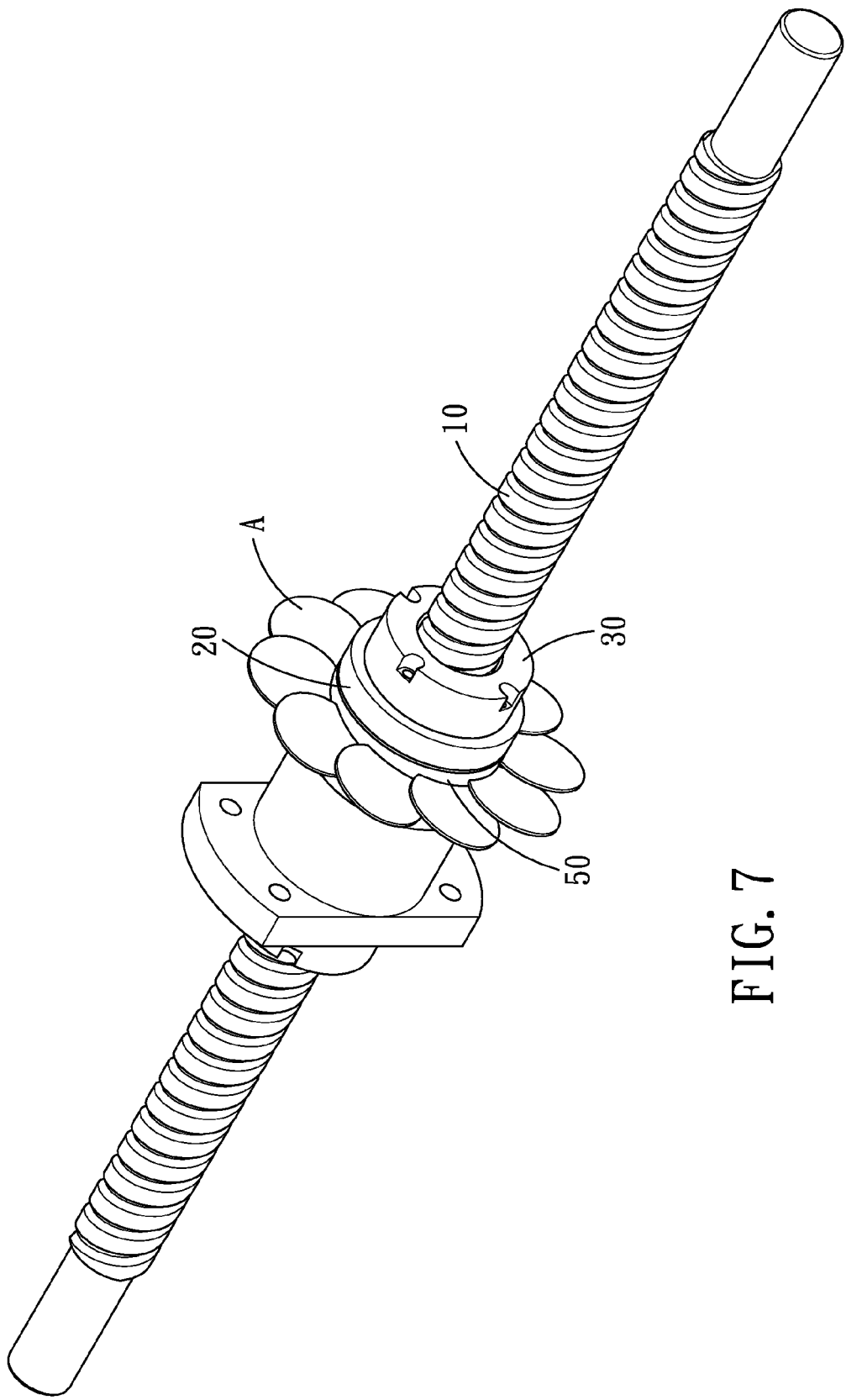
FIG. 7 is a perspective view illustrating how the ball screw in accordance with the present invention exerts the cooling effect.

As shown in FIG. 7, the sleeve 50 is provided with plural blades A on its circumferential surface, so that when the shaft 10 is rotated, the nut 20 will move, and the sleeve 50 will be rotated to drive the blades A to produce wind so as to cool the movable platform disposed on the nut 20.

Figure 8:
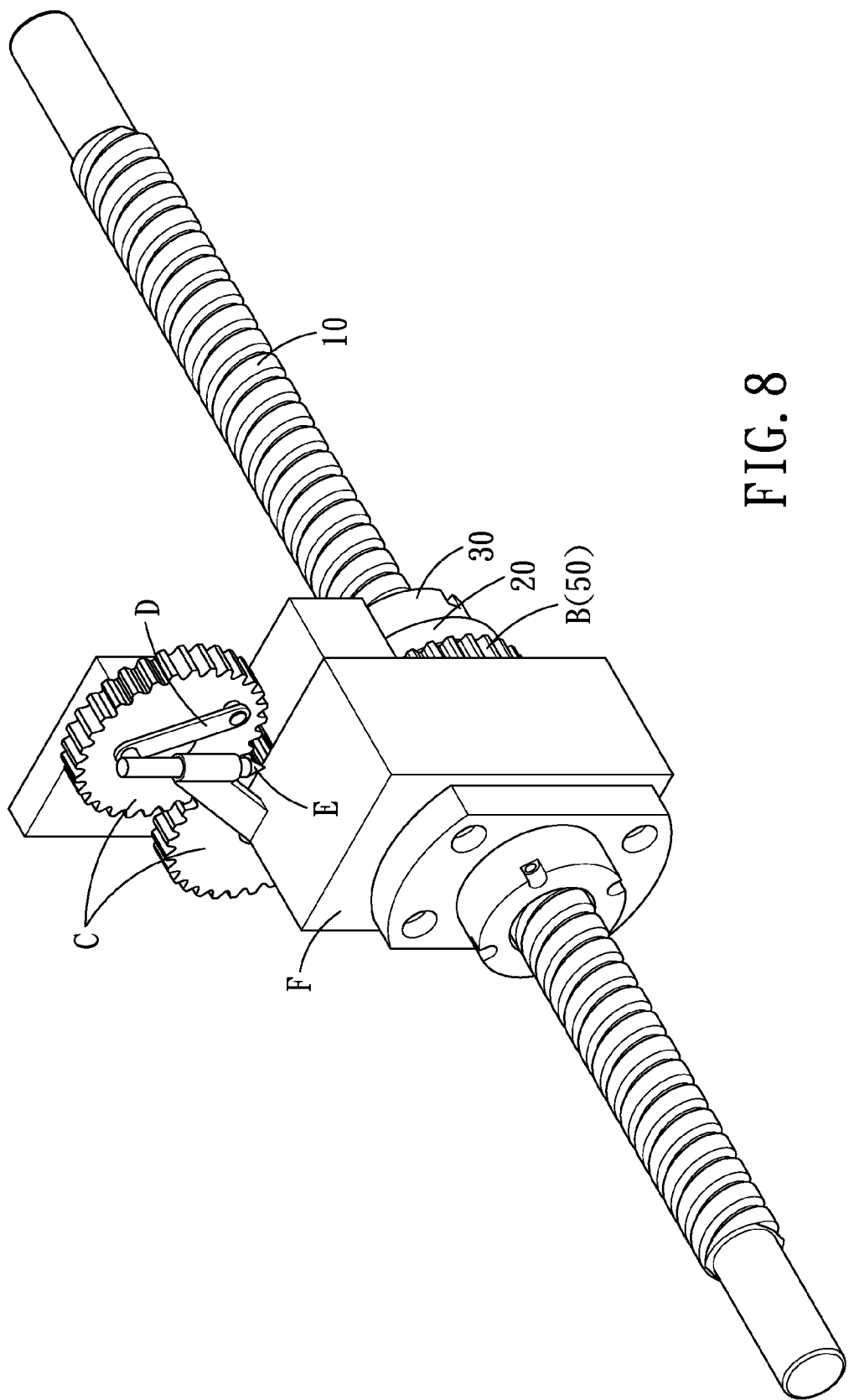
FIG. 8 is a perspective view illustrating how the ball screw in accordance with the present invention is used to punch a hole.

As shown in FIG. 8, the sleeve 50 is provided on its circumferential surface with a gear B which is linked with plural idle wheels C and finally linked with a punch F through a crank D disposed on a movable platform F. When the shaft 10 rotates, the nut 20 will move, and the sleeve 50 and the gear B will rotate to drive the respective idle wheels C in order, so that the punch E will be driven by the crank D to perform reciprocal punching operation to achieve the objective of punching a hole.

Figure 9:
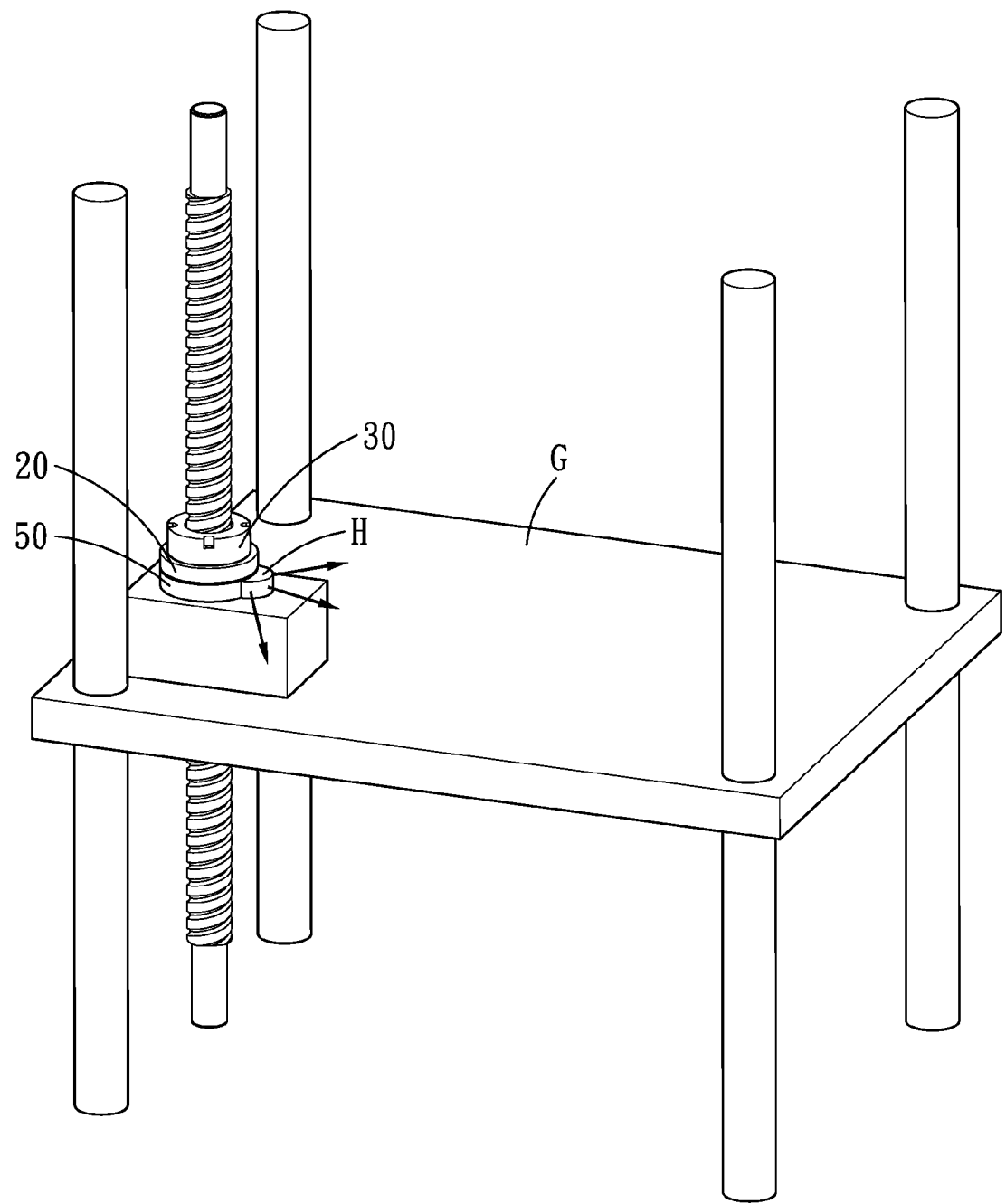
FIG. 9 is a schematic view illustrating how the ball screw in accordance with the present invention offer the warning function when being applied to a lifting platform.

As shown in FIG. 9, if the ball screw of the present invention is applied on a lifting platform G (such as a stereo parking lot), the nut 20 will be cooperatively disposed on the lifting platform G. The sleeve 50 is located above the lifting platform G and provided with a light-emitting element H on its circumferential surface. By such arrangements, if the lifting platform G lifts and descends, the sleeve 50 will be rotated to drive the light-emitting element H to rotate synchronously. Therefore, while the lifting platform G is operated, the rotation of the luminous light-emitting element H will be observed, thus providing a warning function.

Based on the above structures, the present invention can provide the following functions:

1. The ball screw of the present invention utilizes the rotation of the shaft 10 to make the rolling elements 40 roll circularly in the nut 20, and between the respective push grooves 53 of the sleeve 50 and the rolling passage 22 is defined an angular difference, so that when the rolling elements 40 pass through the rolling passage 22, the push grooves 53 of the sleeve 50 will be pushed by the rolling elements 40 to convert the linear motion into rotary motion to provide a torque so as to rotate the sleeve 50, thus utilizing the rotation of the sleeve 50 to provide an extra power.

2. The ball screw of the present invention utilizes the rotation of the sleeve 50 to provide the extra power, so that when the sleeve 50 is provided with the blades A on its circumferential surface, the blades A will rotate to produce wind to cool the movable platform disposed on the nut 20 without using additional assist cooling structure or device, thus saving cost.

3. The ball screw of the present invention utilizes the rotation of the sleeve 50 to provide the extra power, so that when the sleeve 50 is provided on its circumferential surface with the gear B which is linked with plural idle wheels C and finally linked with a punch F through a crank D disposed on a movable platform F, the reciprocal punching operation of the punch E will be performed, thus achieve the objective of punching a hole. As a result, the ball screw of the present invention can perform two kinds of operations synchronously.

4. When the ball screw of the present invention is applied on a lifting platform G, the rotation of the sleeve 50 will drive the light-emitting element H disposed on the circumferential surface of the sleeve 50 to rotate synchronously, so that when the lifting platform G lifts and descends, the rotation of the luminous light-emitting element H can be observed, thus offering the warning function.

While we have shown and described various embodiments in accordance with the present invention, it is clear to those skilled in the art that further embodiments may be made without departing from the scope of the present invention.

What is claimed is:

1. A ball screw comprising:
a shaft including a thread groove in an outer circumferential surface;
a nut provided with a through hole to be movably mounted on the shaft, the through hole including a thread channel in an inner circumferential surface, the thread groove cooperating with the thread channel to define a loaded path, the nut being axially provided with a rolling passage which has an angular difference with respect to the shaft, the nut being further provided in an outer circumferential surface thereof with a circular groove communicating with the rolling passage;
a return element disposed on the nut and provided with a return passage, which connects with the loaded path to define a circulation path;
plural rolling elements provided in the circulation path; and
a sleeve disposed in the circular groove of the nut and provided in an inner circumferential surface thereof with plural push grooves parallel to the shaft, there being an angular difference between the respective push grooves and the rolling passage, and the push grooves cooperating with the rolling elements that pass through the rolling passage.

2. The ball screw as claimed in claim 1, wherein the rolling elements are balls.

3. The ball screw as claimed in claim 1, wherein the sleeve is provided with an annular bearing groove in at least one end surface thereof, in the annular bearing groove are disposed plural bearing elements, the bearing elements are in contact with side walls of the circular groove.

4. The ball screw as claimed in claim 1, wherein the nut is axially provided with plural locking holes in each of two opposite ends thereof, and the respective return elements are axially provided with plural locking holes, the return elements are combined to the nut by screwing screws into the locking holes.

5. The ball screw as claimed in claim 1, wherein the sleeve consists of two semicircular sleeve elements, both ends of the respective sleeve elements are provided with a combining end in such a manner that the combining ends of one of the sleeve elements are combined to the combining ends of the other of the sleeve elements to form a circle.

6. The ball screw as claimed in claim 1, wherein the angular difference between the respective push grooves and the rolling passage is 45 degrees.

7. A ball screw comprising:
a shaft including a thread groove in an outer circumferential surface;
a nut provided with a through hole to be movably mounted on the shaft, the through hole including a thread channel in an inner circumferential surface thereof, the thread groove cooperating with the thread channel to define a loaded path, the nut being axially provided with a rolling passage, the nut being further provided in an outer circumferential surface thereof with a circular groove communicating with the rolling passage;
two return elements disposed on the nut and each of the return elements being provided with a return passage, which connects with the loaded path to define a circulation path;
plural rolling elements provided in the circulation path; and
a sleeve disposed in the circular groove of the nut and provided in an inner circumferential surface thereof with plural push grooves, there being an angular difference between the respective push grooves and the rolling passage, and the push grooves cooperating with the rolling elements that pass through the rolling passage.

8. The ball screw as claimed in claim 7, wherein the rolling elements are balls.

9. The ball screw as claimed in claim 7, wherein the sleeve is provided with an annular bearing groove in at least one end surface thereof, in the annular bearing groove are disposed plural bearing elements, the bearing elements are in contact with side walls of the circular groove.

10. The ball screw as claimed in claim 7, wherein the nut is axially provided with plural locking holes in each of two opposite ends thereof, and the respective return elements are axially provided with plural locking holes, the return elements are combined to the nut by screwing screws into the locking holes.

11. The ball screw as claimed in claim 7, wherein the sleeve consists of two semicircular sleeve elements, both ends of the respective sleeve elements are provided with a combining end in such a manner that the combining ends of one of the sleeve elements are combined to the combining ends of the other of the sleeve elements to form a circle.

12. The ball screw as claimed in claim 7, wherein the combing ends of the sleeve elements are provided with threaded holes to be screwed on screws.

13. The ball screw as claimed in claim 7, wherein the angular difference between the respective push grooves and the rolling passage is 45 degrees.

14. A ball screw comprising:
a shaft including a thread groove in an outer circumferential surface;
a nut provided with a through hole to be movably mounted on the shaft, the through hole including a thread channel in an inner circumferential surface thereof, the thread groove cooperating with the thread channel to define a loaded path, the nut being axially provided with a rolling passage parallel to the shaft, the nut being further provided in an outer circumferential surface thereof with a circular groove communicating with the rolling passage;
a return element disposed on the nut and provided with a return passage, which connects with the loaded path to define a circulation path;
plural rolling elements provided in the circulation path; and
a sleeve disposed in the circular groove of the nut and provided in an inner circumferential surface thereof with plural push grooves, there being an angular difference between the respective push grooves and the rolling passage, and the push grooves cooperating with the rolling elements that pass through the rolling passage.

15. The ball screw as claimed in claim 14, wherein the rolling elements are balls.

16. The ball screw as claimed in claim 14, wherein the sleeve is provided with an annular bearing groove in at least one end surface thereof, in the annular bearing groove are disposed plural bearing elements, the bearing elements are in contact with side walls of the circular groove.

17. The ball screw as claimed in claim 14, wherein the nut is axially provided with plural locking holes in each of two opposite ends thereof, and the respective return elements are axially provided with plural locking holes, the return elements are combined to the nut by screwing screws into the locking holes.

18. The ball screw as claimed in claim 14, wherein the sleeve consists of two semicircular sleeve elements, both ends of the respective sleeve elements are provided with a combining end in such a manner that the combining ends of one of the sleeve elements are combined to the combining ends of the other of the sleeve elements to form a circle.

19. The ball screw as claimed in claim 14, wherein the angular difference between the respective push grooves and the rolling passage is 45 degrees.

* * * * *